(12) United States Patent
Lefevre et al.

(10) Patent No.: US 11,812,206 B2
(45) Date of Patent: Nov. 7, 2023

(54) METHOD AND APPARATUS FOR ONU ACTIVATION

(71) Applicant: Nokia Solutions and Networks Oy, Espoo (FI)

(72) Inventors: Yannick Lefevre, Heverlee (BE); Amitkumar Mahadevan, Edison, NJ (US); Werner Van Hoof, Aartselaar (BE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/562,273

(22) Filed: Dec. 27, 2021

(65) Prior Publication Data
US 2022/0248111 A1 Aug. 4, 2022

(30) Foreign Application Priority Data
Feb. 3, 2021 (EP) .................................. 21155057

(51) Int. Cl.
*H04Q 11/00* (2006.01)
*H04B 10/272* (2013.01)

(52) U.S. Cl.
CPC ....... *H04Q 11/0067* (2013.01); *H04B 10/272* (2013.01); *H04Q 11/0005* (2013.01); *H04Q 2011/0047* (2013.01)

(58) Field of Classification Search
CPC ................................................. H04Q 11/0067
See application file for complete search history.

(56) References Cited

U.S. PATENT DOCUMENTS

| | | | |
|---|---|---|---|
| 2013/0156420 A1* | 6/2013 | Amitai .................. | H04L 1/0009 398/27 |
| 2018/0191461 A1* | 7/2018 | Li ........................ | H04L 1/0008 |
| 2019/0174212 A1* | 6/2019 | Detwiler .............. | H04L 1/0075 |
| 2020/0304196 A1* | 9/2020 | Nammi ................ | H03M 13/353 |
| 2020/0344534 A1* | 10/2020 | Luo .................... | H04Q 11/0067 |
| 2021/0144693 A1* | 5/2021 | Qu ....................... | H04W 52/146 |
| 2022/0149969 A1* | 5/2022 | Khotimsky ......... | H04J 14/0227 |

FOREIGN PATENT DOCUMENTS

WO WO-2020/078016 A1 4/2020

OTHER PUBLICATIONS

Cao et al., An Improved FEC Scheme for 10G EPON Based on Channel Adaptation, ACP Technical Digest, OSA, 2012 (Year: 2012).*

(Continued)

*Primary Examiner* — Shi K Li

(74) *Attorney, Agent, or Firm* — Harness, Dickey & Pierce, P.L.C.

(57) ABSTRACT

An apparatus, for use by an Optical Network Unit, performs receiving, from an Optical Line Terminal, a broadcast message including code set information indicating a first code set selected from a plurality of error correction code sets; determining whether the first code set is comprised in a group of code sets supported by the Optical Network Unit, wherein, the group of code sets includes at least one code set of the plurality of error correction code sets; and encoding an upstream transmission with the first code set, in case the first code set is included in the group of code sets.

16 Claims, 4 Drawing Sheets

(56) References Cited

OTHER PUBLICATIONS

ITU-T G987.3, "10-Gigabit-capable passive optical networks (XG-PON): Transmission convergence (TC) layer specification", Oct. 2010. (Year: 2010).*
European Search Report dated Jul. 5, 2021.
Yuanqiu Luo et al., "Higher Speed Passive Optical Networks: Common Transmission Convergence Layer Specification" International Telecommunication Union, vol. 2/15, Oct. 15, 2020.
"G.hsp.comTC: Scheme for flexible FEC in G.hsp upstream," ITU Telecommunication Standardization Sector, Dec. 15-17, 2020, pp. 1-5.

* cited by examiner

METHOD AND APPARATUS FOR ONU ACTIVATION

CROSS-REFERENCE TO RELATED APPLICATIONS

This application claims priority from European Patent Application No. 21155057.9 filed on Feb. 3, 2021 in the European Patent Office, the disclosure of which is incorporated herein by reference in its entirety.

FIELD OF THE INVENTION

Various example embodiments relate to Passive Optical Networks, specifically to coding scheme for upstream transmission.

BACKGROUND

For the next-generation 25G/50G technologies, Passive Optical Networks (PON) technologies will use low density parity check (LDPC) codes for forward error correction (FEC).

An LDPC code is a block code that takes K information bits and encodes these K bits into a codeword of N bits, which generally includes the K information bits in addition to N−K parity bits. The code rate of a LDPC code is R=K/N, and its characteristics are fully described by a (N−K)×N parity check matrix H.

Shortening and puncturing are two simple techniques that can be used to derive additional LDPC daughter codes from a so-called LPDC mother code. By jointly puncturing and shortening, the rate of an LDPC code can be adjusted over a wide range.

Within the G.hsp standard, LDPC codes are used to lower the bit error rate (BER) from in worst-case 1e-2 before the LDPC decoding (input BER) to 1e-12 after the LDPC decoding (output BER). Meanwhile, lower code rate with higher BER may be acceptable.

Therefore, the disclosure of W. Van Hoof, A. Mahadevan, Y. Lefevre, R. Borkowski, "G.hsp.comTC: Scheme for flexible FEC in G.hsp upstream", D25, ITU-T Q2 conference call, Dec. 15-17, 2020 has recently proposed a flexible FEC scheme, in which a FEC code can be selected on a per-ONU basis to take advantage of a throughput vs. BER performance trade-off. This scheme is based on specifying a small number of pre-defined FEC 'code-sets' in the standard and having the Optical Line Terminal (OLT) choose from one of these code-sets independently for the upstream transmission bursts of each Optical Network Unit (ONU). In other words, the OLT is provided with the capability of selecting the code-set for each ONU independently, and the ability to change the selected code-set over time.

In the above disclosure, the support of all the defined code-sets was made mandatory for all ONUs. However, it is desirable to be able to mix ONUs with different capabilities, i.e., ONUs supporting different sets of code-sets in the same PON network.

There is thus a need for an improved method and apparatus to solve the problem of how to activate the ONUs with different capabilities.

SUMMARY OF THE INVENTION

According to a first aspect of the invention, there is provided an apparatus, for use by an Optical Network Unit (121, 122, 123), comprising means for: receiving, from an Optical Line Terminal (110), a broadcast message comprising code set information indicating a first code set selected from a plurality of predefined error correction code sets, determining whether the first code set is comprised in a group of code sets supported by the Optical Network Unit (121, 122, 123), wherein, said group of code sets comprises at least one code set of the plurality of predefined error correction code sets; encoding predefined upstream transmission with the first code set, in case the first code set is comprised in said group of code sets.

In one embodiment, the code set information indicating the first code-set is comprised in a burst profile and is received in a broadcast burst-profile message.

In one embodiment, the means are further configured for: receiving a grant message from the Optical Line Terminal, wherein the grant message comprises a reference to a burst profile and comprises information related to the predefined upstream transmission.

In one embodiment, the grant message is a serial number grant message.

In another embodiment, the respective code set comprises at least a baseline forward error correction code and at least one burst terminating code.

In a further embodiment, the respective code set comprises codes derived by puncturing and/or shortening from a mother forward error correction code.

In yet another embodiment, the codes in the code sets are low density parity check codes.

In yet another embodiment the means comprises: at least one processor; and at least one memory including computer program code, the at least one memory and computer program code configured to, with the at least one processor, cause the performance of the apparatus.

According to a second aspect of the invention, there is provided an apparatus (200), for use by an Optical Line Terminal (110), comprising means for: broadcasting code set information indicating a code set selected from a plurality of predefined error correction code sets, in a broadcast message to Optical Network Units (121, 122, 123); for use by at least one of the Optical Network Units to encode predefined upstream transmission.

In one embodiment, the means are further configured for: repeating the broadcasting of the code set information indicating respective code sets selected from the plurality of predefined error correction code sets, in respective broadcast messages to the Optical Network Units.

In one embodiment, the code set information indicating the respective code set is comprised in a respective burst profile and is sent using a respective broadcast burst-profile message.

In one embodiment, the means are further configured for: distributing a grant message to the at least one of the Optical Network Units, wherein the grant message comprises a reference to the respective burst profile and comprises information related to the predefined upstream transmission.

In another embodiment, the means comprises: at least one processor; and at least one memory including computer program code, the at least one memory and computer program code configured to, with the at least one processor, cause the performance of the apparatus.

According to a third aspect of the invention, there is provided a method, for use by an Optical Network Unit (121, 122, 123), comprising: receiving, from an Optical Line Terminal (110), a broadcast message comprising code set information indicating a first code set selected from a plurality of predefined error correction code sets, determining whether the first code set is comprised in a group of code sets supported by the Optical Network Unit (121, 122, 123), wherein, said group of code sets comprises at least one code set of the plurality of predefined error correction code sets; encoding predefined upstream transmission with the first code set, in case the first code set is comprised in said group of code sets.

According to a fourth aspect of the invention, there is provided a method, for use by an Optical Line Terminal (110), comprising: broadcasting code set information indicating a code set selected from a plurality of predefined error correction code sets, in a broadcast message to Optical Network Units (121, 122, 123); for use by at least one of the Optical Network Units to encode predefined upstream transmission.

According to the example embodiments, activation scheme is proposed for ONUs supporting different sets of code sets, thus it is possible for a PON to have simultaneously ONUs with different capabilities. ONUs supporting only a single default code-set, and have minimal complexity, can be combined with ONUs that support code sets that can correct more errors, and allow operation at a higher bit-error rate (BER) and a better sensitivity.

BRIEF DESCRIPTION OF THE FIGURES

For a more complete understanding of example embodiments of the present invention, reference is now made to the following descriptions taken in connection with the accompanying drawings in which.

Same or similar reference numerals refer to same or similar parts, components or method steps.

DETAILED DESCRIPTION

Figure 1:
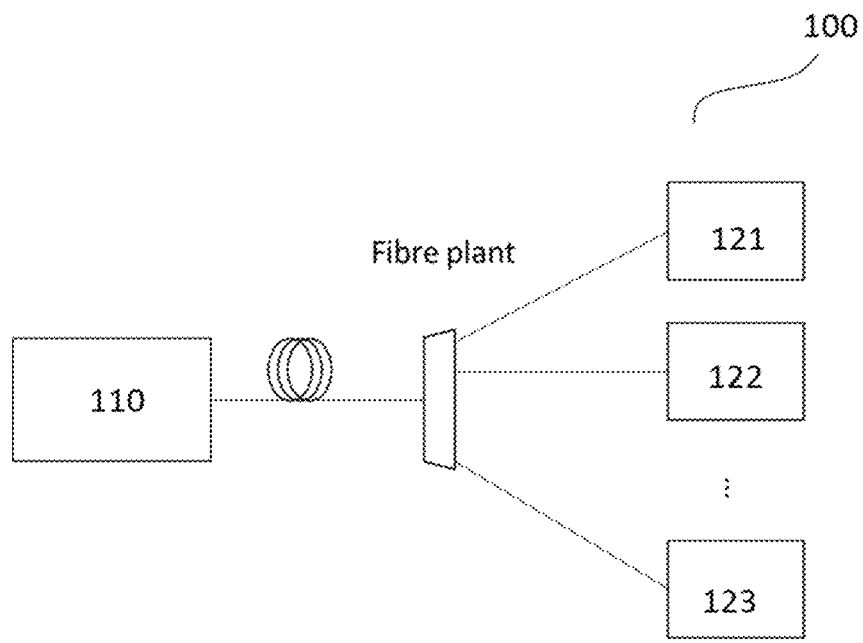
FIG. 1 shows a part of an exemplifying communication network in which examples of disclosed embodiments may be applied.

Example embodiments of the present application are described herein in detail and shown by way of example in the drawings. It should be understood that, although specific embodiments are discussed herein there is no intent to limit the scope of the invention to such embodiments. To the contrary, it should be understood that the embodiments discussed herein are for illustrative purposes, and that modified and alternative embodiments may be implemented without departing from the scope of the invention as defined in the claims. The sequence of method steps is not limited to the specific embodiments, the method steps may be performed in other possible sequence. Similarly, specific structural and functional details disclosed herein are merely representative for purposes of describing the embodiments. The invention described herein, however, may be embodied in many alternate forms and should not be construed as limited to only the embodiments set forth herein.

FIG. 1 shows a part of an exemplifying communication network in which examples of disclosed embodiments may be applied.

As shown in FIG. 1 in a PON 100, an OLT 110 at the network side is used to connect to a plurality of ONUs 121, 122, . . . , 123 at the user side by means of an optical distribution network (ODN) or fiber plant that contains optical fibers and splitters, but no active components. A skilled person shall understand the number of ONUs is not limited to the given example. The OLT 110 may be connected to for example up to 64 ONUs.

Most PON technologies such as G-PON, E-PON, and XGS-PON are time-division multiplexing (TDM) PON technologies, in which the fiber medium is shared in time between the different ONUs. In addition, time- and wavelength-division multiplexing (TWDM) PON technologies exist, such as next-generation NG-PON2, in which multiple TDM systems at different wavelength are stacked on the same PON system. Example embodiments apply to both TDM and TWDM PON systems.

For a specific upstream wavelength in a T(W)DM PON system, burst mode transmission in the upstream direction involves one ONU transmitting at any given time. In previous PON systems such as XGS PON and IEEE 802.3ca, the choice of FEC code for upstream transmission is determined by the corresponding standard. All ONUs are expected to transmit based on the selected FEC code.

Recently, a flexible FEC scheme has been proposed, in which a FEC code can be selected on a per-ONU basis to take advantage of a throughput vs. BER performance trade-off. This scheme is based on specifying a small number of pre-defined FEC 'code-sets' in the standard and having the OLT choose from one of these code-sets independently for the upstream transmission bursts of each ONU. In other words, the OLT is provided with the capability of selecting the code-set for each ONU independently, and the ability to change the selected code-set over time.

In the above disclosure, it is necessary for all ONUs to support all the predefined code sets.

However, in one example scenario, support of the different code-sets is optional for the ONUs. ONUs only have to support a default code-set, and support for the remaining code-sets is optional. In another example scenario, during upgrade in the future, more code sets may be defined, and these higher version ONUs may still co-exist with the lower version ONUs that do not support all the code sets. For instance, first-version ONUs that support a smaller set of code-sets (or only a default code-set) may be mixed with second-version ONUs that support a higher number of code sets. These second-version ONUs may support a code set that can correct more errors and thus operate at a higher BER than the default code-set. This high-BER code set may enable ONUs to operate at worse channel conditions than the default code.

Thus, it is desirable to be able to mix ONUs with different capabilities, i.e., ONUs supporting different sets of code-sets in the same PON network.

Figure 2:
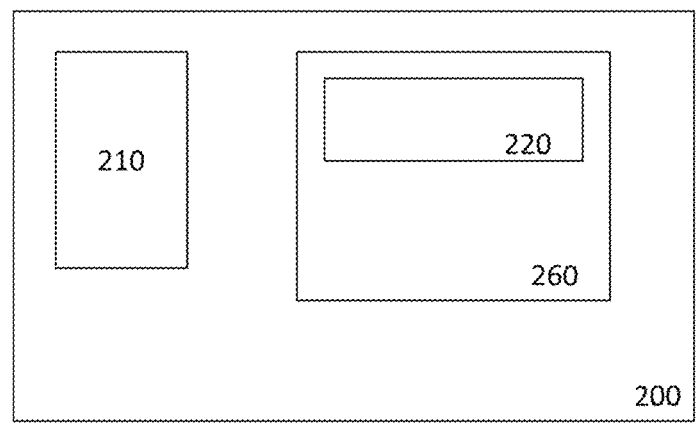
FIG. 2 shows a block diagram of an example apparatus 200 in which examples of the disclosed embodiments may be applied.

The example of FIG. 2 shows an exemplifying apparatus 200.

FIG. 2 is a block diagram depicting the apparatus 200 operating in accordance with an example embodiment of the invention. The apparatus 200 may be, for example, an electronic device such as a chip, chip-set, an electronic device or an OLT. In the example of FIG. 2, the apparatus 200 is implemented in an OLT, such as the OLT 110 in FIG. 1. The apparatus 200 includes a processor 210 and a memory 260. In other examples, the apparatus 200 may comprise multiple processors.

Figure 3:
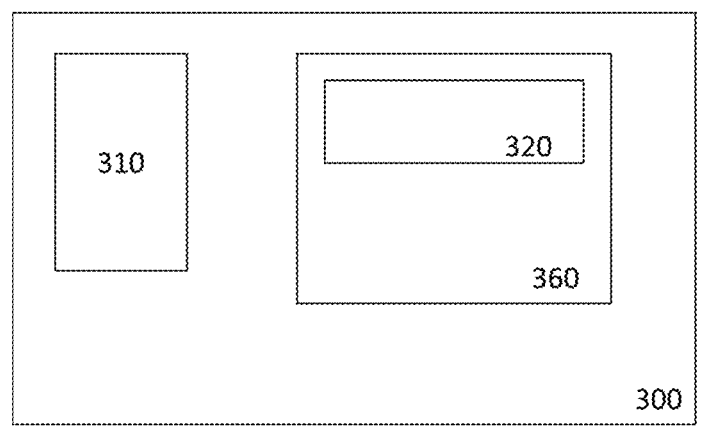
FIG. 3 shows a block diagram of an example apparatus 300 in which examples of the disclosed embodiments may be applied.

The example of FIG. 3 shows an exemplifying apparatus 300.

FIG. 3 is a block diagram depicting the apparatus 300 operating in accordance with an example embodiment of the invention. The apparatus 200 may be, for example, an electronic device such as a chip, chip-set, an electronic device or an ONU. In the example of FIG. 3, the apparatus 300 is implemented in an ONU, such as the ONU 121, 122, 123 in FIG. 1. The apparatus 300 includes a processor 310 and a memory 360. In other examples, the apparatus 300 may comprise multiple processors.

For simplicity, in the following only the exemplifying apparatus 200 will be described. A skilled person shall understand, all the features described below for apparatus 200 apply also to the apparatus 300.

In the example of FIG. 2, the processor 210 is a control unit operatively connected to read from and write to the memory 260. The processor 210 may also be configured to receive control signals received via an input interface and/or the processor 210 may be configured to output control signals via an output interface. In an example embodiment the processor 210 may be configured to convert the received control signals into appropriate commands for controlling functionalities of the apparatus 200.

The memory 260 stores computer program instructions 220 which when loaded into the processor 210 control the operation of the apparatus 200 as explained below. In other examples, the apparatus 200 may comprise more than one memory 260 or different kinds of storage devices.

Computer program instructions 220 for enabling implementations of example embodiments of the invention or a part of such computer program instructions may be loaded onto the apparatus 200 by the manufacturer of the apparatus 200, by an operator of the apparatus 200, or by the apparatus 200 itself based on a download program, or the instructions can be pushed to the apparatus 200 by an external device. The computer program instructions may arrive at the apparatus 200 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

According to an example embodiment, the apparatus 200 comprises means for performing, wherein the means for performing comprises at least one processor 210, at least one memory 260 including computer program code 220, the at least one memory 260 and the computer program code 220 configured to, with the at least one processor 210, cause the performance of the apparatus 200.

Figure 4:
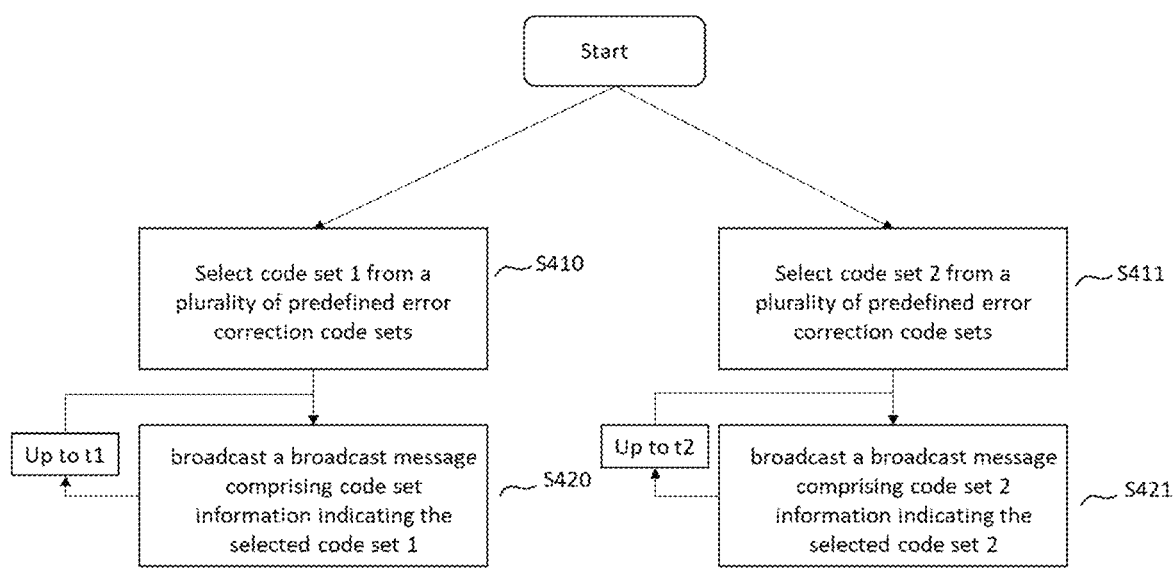
FIG. 4 shows a flow diagram according to one example method implementation which apparatus 200 may perform.

FIG. 4 shows a flow diagram according to one example method implementation which apparatus 200 may perform.

An OLT, for example the OLT 110 of FIG. 1, implementing the apparatus 200 in which examples of the disclosed embodiments may be applied, supports one or more error correction code sets of a plurality of predefined error correction code sets. The plurality of predefined error correction code sets may be predefined for example in a standard, or in a list maintained by a manufacturer or an operator. Each of the code sets indicates a coding scheme that may be used by one of the ONUs to encode the upstream transmission. The OLT is able to decode an upstream transmission encoded using at least one of the plurality of predefined error correction code sets.

In one embodiment, the codes in the plurality of error correction code sets may be LDPC codes.

In one example embodiment, the plurality of predefined error correction code sets comprises a default code set, that is supported by all ONUs.

Furthermore, the plurality of predefined error correction code sets may comprise a code set capable of operating at a BER higher than that of the default code set and/or a code set capable of operating at a BER lower than that of the default code set.

In another example embodiment, the respective code set comprises codes derived by puncturing and/or shortening from a mother FEC code, for example the IEEE 802.3ca LDPC mother code. In another example, the codes in the predefined code sets are all derived from the same mother FEC code by puncturing and/or shortening.

Shortening: the LDPC code can be modified by setting information bits to a fixed value (0), and not transmitting the bits. Shortening $N_s$ bits lowers the information rate to $R=(K-N_s)/(N-N_s)$, and allows to achieve the same output BER at an increased BER value.

Puncturing: the LDPC can be modified by not transmitting certain bits (either information or parity bits). These bits are than treated as erasures at the receiver (i.e., bits with unknown value), and should be retrieved by the LDPC decoder). Puncturing $N_p$ increase the information rate to $R=K/(N-N_p)$, but requires a lower input BER to achieve the same output BER.

By jointly puncturing and shortening, the rate $R=(K-N_s)/(N-N_p-N_s)$ of an LDPC code can be adjusted over a wide range. If for instance, keeping the code length fixed to N', the code length can be varied from $R_{min}=(K-(N-N'))/N'$ to $R_{max}=K/N'$.

Higher-rate codes may be used to achieve a higher throughput or data rate, but have reduced error correcting capability and can only operate at a lower BER, and thus higher received power. Lower-rate codes may be used to correct more errors, and enable operation at a higher BER and thus at a lower receive power. Each code set is characterized by a maximal BER that can be corrected and an information rate that is achieved. An OLT can only successfully decode the upstream transmission from an ONU using a code set, if the BER of the channel between the ONU and the OLT is lower than the maximally correctable BER of the code set. Depending on the BER of the channel between the ONU and the OLT, the OLT may select the code set that has the highest code rate, while still being able to correct the errors.

Before and during the activation of an ONU, the OLT is unaware of the BER or channel conditions of the ONU. To enable activation of any ONU, the OLT may provide activation opportunities using the lowest-rate code, which support operation at the highest BER, that may possibly be supported by any ONU in the system. For example, there may be two types of ONUs in the system, one type that supports only a default code set, and a second type that additionally supports a code set with a lower code rate or a higher maximally correctable BER. To enable activation for both types of ONUs, the OLT may provide activation opportunities using both code sets. The activation opportunities using the default code set may be used by ONUs of both types, while the activation opportunities using the higher-BER code set may be used only by ONUs of the second type. Thus, ONUs of the second type that may not be able to activate using the default code set due to the channel BER being higher than the maximal BER of the default code set, may still be able to activate using the higher-BER code set.

In yet another embodiment, the respective code set may comprise at least a baseline FEC code. In another embodiment, the respective code set may further comprise at least one burst terminating code.

Specifically, the baseline FEC code is used for majority of the burst, and the burst-terminating codes is used for efficiency improvement of the last codeword in the burst. Burst termination may involve using a different puncturing and minimum shortening for the last codeword in a burst in order to improve efficiency while still achieving BER performance equal to or better than the baseline code of the code-set.

In step S410, a first code set, code set 1, is selected from the plurality of predefined error correction code sets. In step S420 code set information indicating the selected code set 1 is broadcasted in a broadcast message to the ONUs; for use by at least one of the ONUs to encode predefined upstream transmission.

Optionally, the apparatus is further configured to repeat the broadcasting of the code set information indicating respective code sets selected from the plurality of error correction code sets, in respective broadcast messages to the ONUs.

Specifically, the step S420 may be repeated. The repetition may be periodic or nonperiodic. The time interval between two broadcast messages comprising code set information may be up to a predetermined time interval t1. In one example, the time interval may be determined based on certain conditions.

FIG. 4 shows additionally and optionally that a second code set, code set 2, is selected from the plurality of predefined error correction code sets in step S411. In step S421 code set information indicating the selected code set 1 is broadcasted in a broadcast message to the ONUs; for use by at least one of the ONUs to encode predefined upstream transmission.

Similarly, the step S421 may also be repeated according to a time interval up to a predetermined time interval t2 that is similar to the time interval t1.

A skilled person shall understand that the code set selected are supported by the OLT. In an example, the code set supported by an OLT may be used to build up a sub set of supported code sets.

Figure 5:
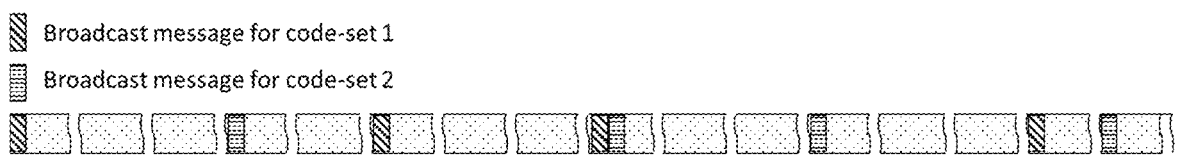
FIG. 5 shows a schematic view of the signal transmitted by the OLT according to the embodiment of FIG. 4.

FIG. 5 shows a schematic view of the signal transmitted by the OLT according to the embodiment of FIG. 4.

As can be seen from FIG. 5, broadcasting of code set information indicating code set 1 is repeated regularly. Independently or dependently, the broadcasting of code set information indicating code set 2 is also repeated regularly in parallel.

Figure 6:
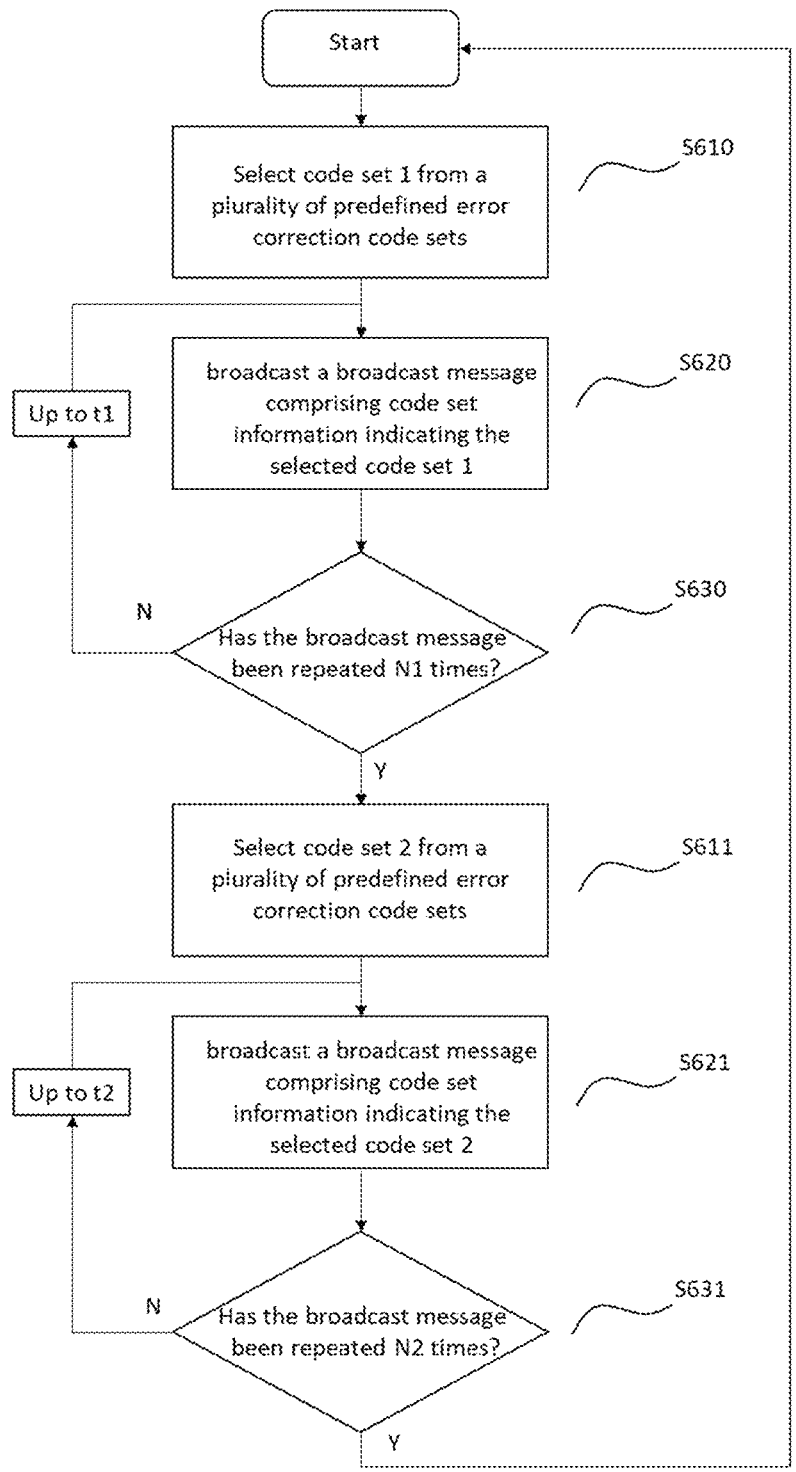
FIG. 6 shows a flow diagram according to another example method implementation which apparatus 200 may perform.

FIG. 6 shows a flow diagram according to another example method implementation which apparatus 200 may perform.

Similar as above described with respect to FIG. 4, two code sets, code set 1 and code set 2, are selected from the plurality of predefined error correction code sets. Different from FIG. 4, the broadcasting of code set information indicating code set 1 may be repeated for a predetermined times N1.

Then the broadcasting of code set information indicating code set 2 may be repeated for another predetermined times N2.

The time interval between two broadcast messages comprising code set information may be similar as described with respect to FIG. 4.

Figure 7:
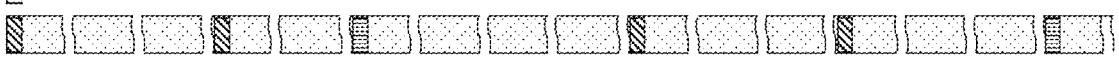
FIG. 7 shows a schematic view of the signal transmitted by the OLT according to the embodiment of FIG. 6.

FIG. 7 shows a schematic view of the signal transmitted by the OLT according to the embodiment of FIG. 6.

As can be seen from FIG. 7, broadcasting of code set information indicating code set 1 is repeated 2 times, N1=2. Then sequentially, the broadcasting of code set information indicating code set 2 is repeated once N2=1.

In one example embodiment, the code set information indicating the respective code set is comprised in a respective burst profile and is sent using a respective broadcast burst-profile message. Specifically, the broadcast message may be a burst-profile downstream Physical Layer Operations Administration and Maintenance (PLOAM) message.

In a further embodiment, the respective code set information may be indicated in Octet 6 or Octet 39 of the respective burst-profile message. Specifically, the respective code set information maybe indicated in four higher bits of Octet 6 or Octet 39 of the respective burst-profile message.

More specifically, for example, a sequence of 4 bits in one of the Burst_Profile PLOAMd message Octets is allocated for the code-set indication. This supports up to 16 different code-sets. As an example, the four higher bits of Octet 6 (Burst profile control 2) that are currently unused may be reserved to indicate the FEC code-set associated with a burst profile. Alternatively, 4 bits in Octet 39 may be used.

Figure 8:
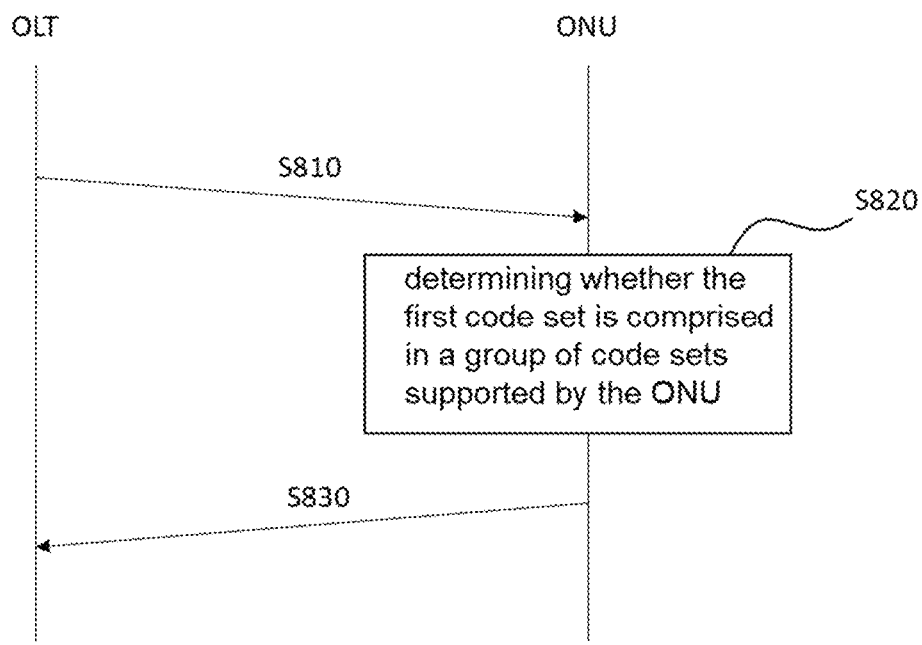
FIG. 8 shows an example signaling diagram incorporating aspects of the examples of the invention.

FIG. 8 shows an example signaling diagram incorporating aspects of the examples of the invention.

As shown in FIG. 8, the OLT, for example the OLT 110 of FIG. 1, implementing the apparatus 200 in which examples of the disclosed embodiments may be applied, broadcasts in step S810 a broadcast message comprising code set information indicating a first code set selected from a plurality of predefined error correction code sets supported by the OLT.

The ONU, for example the ONU 121 of FIG. 1, implementing an apparatus 300 in which examples of the disclosed embodiments may be applied, supports at least one code set of the plurality of predefined error correction code sets. The ONU receives the broadcast message from the OLT and then determines in step S820 whether the first code set is comprised in a group of code sets supported by the ONU, wherein, said group of code sets comprises at least one code set of the plurality of error correction code sets. In case the first code set is comprised in said group of code sets, the ONU then encodes the predefined upstream transmission with the first code set in step S830

The OLT may subsequently decode the upstream transmission from the ONU. The OLT is able to decode an upstream transmission encoded using any code set it selected from the plurality of predefined error correction code sets.

In another embodiment, the apparatus 200 may further be configured to distribute a grant message to at least one ONU desiring to activate, wherein the grant message comprises a reference to the respective burst profile and comprises information related to the predefined upstream transmission.

In one embodiment, the grant message is a serial number grant message. All new ONUs that desire to activate and recognize in the grant message the Serial number grant will process the grant message and look into the content. In another example, the grant message is a directed ranging grant message.

Specifically, the reference to the respective burst profile indicates the ONU which burst profile to use, and the information related to the predefined upstream transmission indicates to the ONU a window in which to send the upstream transmission, for example which time slot it shall use. Furthermore, the information related to the predefined upstream transmission may indicate start time and duration of granted transmission opportunity.

In one embodiment, reference to the respective burst profile may be implemented as a burst-profile index. More specifically, the respective burst-profile is assigned to a respective burst-profile index in the respective broadcast message. The burst-profiles comprising code sets 1 and 2 may be respectively assigned to different indexes. Alternatively, the burst profiles comprising code sets 1 and 2 may be re-assigned to the same index.

Figure 9:
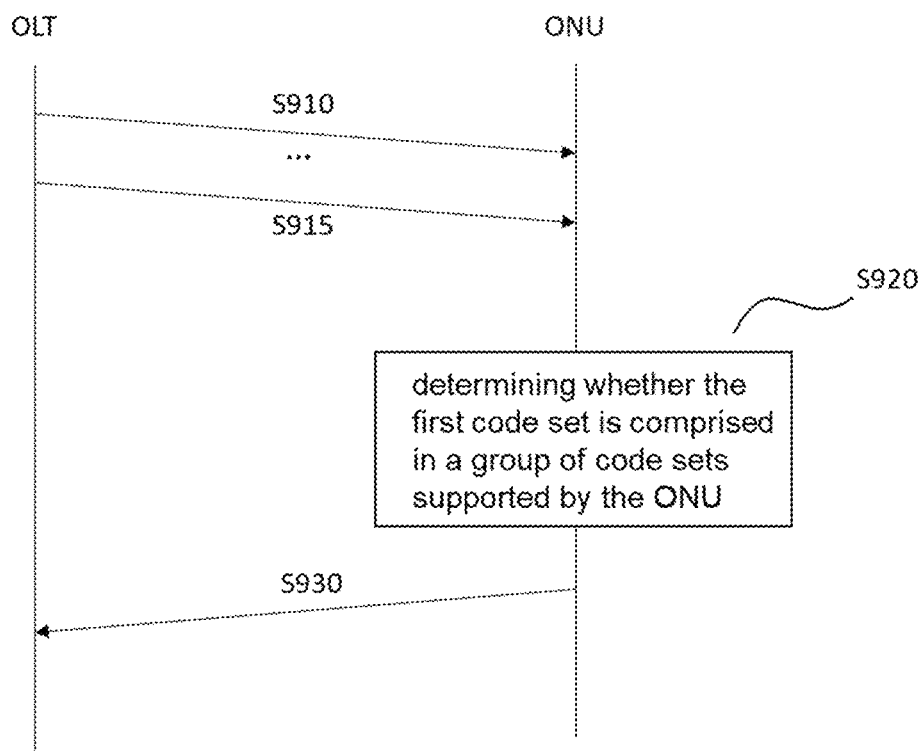
FIG. 9 shows another example signaling diagram according to another example embodiment.

FIG. 9 shows another example signaling diagram according to another example embodiment.

In the example shown in FIG. 9, assuming there are 4 predefined code sets, and the OLT broadcasts in step S910 the respective code set information respectively indicating 4 predefined code sets in 4 burst-profile downstream PLOAM messages. In another embodiment, the OLT may broadcast code set information indicating one selected predefined code sets in one burst-profile downstream PLOAM message.

Then the OLT sent in step S915 a serial number grant message to signal all ONUs that are waiting for activation.

An ONU waiting for activation retrieves a reference to a burst profile from the grant message and then determines, based on the previously received 4 burst profile messages and the received reference, which burst profile is indicated in the grant message. Subsequently, the ONU may retrieve the code set information comprised in the indicated burst profile message. The retrieved code set information indicates a first code set.

Then the ONU may determine in step S920 whether the first code set is comprised in a group of code sets supported by the ONU, for example by comparing the first code set with its list of supporting codes sets.

In case the first code set is comprised in the group of code sets supported by the ONU, the ONU may react on the grant message by transmitting in step S630 predefined upstream transmission which is encoded using the first code set and transmitted at the time slot indicated in the grant message.

The OLT may subsequently retrieve the upstream transmission from the ONU from the indicated time slot and then decode the upstream transmission.

In case the first code set is not comprised in the group of code sets supported by the ONU, the ONU may not react on the grant message, and wait for the next grant message. Alternatively, the ONU may still use a code set that it supports to encode upstream transmission.

In another example, the ONU may check after receiving the burst profile message, whether it supports the code. If not, it would discard the profile for example, set it as unknown. When it then receives a grant, to this discarded profile, it will not respond, because it does not know the profile.

A skilled person shall understand that the sequence of the method is not limited to the illustrated example. The method may be implemented in other sequence.

Without in any way limiting the scope, interpretation, or application of the claims appearing below, a technical effect of one or more of the example embodiments disclosed herein is enabling activation of ONUs supporting different sets of code-sets in the same PON network.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIGS. 2 and 3. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described lo embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus, for use by an Optical Network Unit, comprising:
    at least one processor; and
    at least one memory including computer program code, the at least one memory and computer program code configured to, with the at least one processor, cause the apparatus to perform,
    receiving, from an Optical Line Terminal, a broadcast message comprising code set information indicating a first code set selected from a plurality of predefined error correction code sets, wherein the first code set is selected independently of the Optical Network Unit,
    determining whether the first code set is comprised in a group of code sets supported by the Optical Network Unit, wherein, said group of code sets comprises at least one code set of the plurality of predefined error correction code sets, and
    encoding an upstream transmission with the first code set, in case the first code set is comprised in said group of code sets,
    wherein the broadcast message comprising the code set information indicating the first code set is repeatedly broadcast with a defined time period between each broadcast of the broadcast message.

2. The apparatus according to claim 1, wherein the code set information indicating the first code set is comprised in a burst profile and is received in a broadcast burst-profile message.

3. The apparatus according to claim 2, wherein the apparatus is further configured to perform:

receiving a grant message from the Optical Line Terminal, wherein the grant message comprises a reference to a burst profile and comprises information related to the upstream transmission.

4. The apparatus according to claim 3, wherein the grant message is a serial number grant message.

5. The apparatus according to claim 3, wherein the respective code set comprises at least a baseline forward error correction code and at least one burst terminating code.

6. The apparatus according to claim 3, wherein the respective code set comprises codes derived by puncturing and/or shortening from a mother forward error correction code.

7. The apparatus according to claim 3, wherein the codes in the code sets are low density parity check codes.

8. The apparatus according to claim 1, wherein the code set information further indicates a second code set.

9. The apparatus according to claim 8, wherein the broadcast message comprising the code set information indicating the second code set is repeatedly broadcast with a second defined time period between each broadcast of the broadcast message.

10. The apparatus according to claim 9, wherein the broadcasting of the first code set and the second code set is repeated in parallel.

11. An apparatus, for use by an Optical Line Terminal, comprising:
    at least one processor; and
    at least one memory including computer program code, the at least one memory and computer program code configured to, with the at least one processor, cause the apparatus to perform,
    broadcasting code set information indicating a code set selected from a plurality of predefined error correction code sets, in a broadcast message to Optical Network Units, for use by at least one of the Optical Network Units to encode an upstream transmission, and
    repeating the broadcasting of the code set information indicating respective code sets selected from the plurality of predefined error correction code sets, in respective broadcast messages to the Optical Network Units,
    wherein the code set is selected independently of the Optical Network Units.

12. The apparatus according to claim 11, wherein the code set information indicating the respective code set is comprised in a respective burst profile and is sent using a respective broadcast burst-profile message.

13. The apparatus according to claim 12, wherein the apparatus is further configured to perform:
    distributing a grant message to the at least one of the Optical Network Units,
    wherein the grant message comprises a reference to the respective burst profile and comprises information related to the upstream transmission.

14. The apparatus according to claim 13, wherein the grant message is a serial number grant message.

15. A method, for use by an Optical Network Unit, comprising:
    receiving, from an Optical Line Terminal, a broadcast message comprising code set information indicating a first code set selected from a plurality of predefined error correction code sets, wherein the first code set is selected independently of the Optical Network Unit;
    determining whether the first code set is comprised in a group of code sets supported by the Optical Network Unit, wherein, said group of code sets comprises at least one code set of the plurality of predefined error correction code sets; and
    encoding an upstream transmission with the first code set, in case the first code set is comprised in said group of code sets,
    wherein the broadcast message comprising the code set information indicating the first code set is repeatedly broadcast with a defined time period between each broadcast of the broadcast message.

16. A method, for use by an Optical Line Terminal, comprising:
    broadcasting code set information indicating a code set selected from a plurality of predefined error correction code sets, in a broadcast message to Optical Network Units, for use by at least one of the Optical Network Units to encode an upstream transmission; and
    repeating the broadcasting of the code set information indicating respective code sets selected from the plurality of predefined error correction code sets, in respective broadcast messages to the Optical Network Units,
    wherein the code set is selected independently of the Optical Network Unit.

* * * * *